US00RE33944E

United States Patent [19]

Knauer

[11] E Patent Number: Re. 33,944

[45] Reissued Date of Patent: Jun. 2, 1992

[54] PRINTING MACHINE CYLINDER HOLDER ARRANGEMENT

[76] Inventor: Peter Knauer, Rain am Lech, Fed. Rep. of Germany

[21] Appl. No.: 660,535

[22] Filed: Feb. 25, 1991

Related U.S. Patent Documents

Reissue of:

[64] Patent No.: 4,807,527
Issued: Feb. 28, 1989
Appl. No.: 157,649
Filed: Feb. 18, 1988

[30] Foreign Application Priority Data

Feb. 20, 1987 [DE] Fed. Rep. of Germany ..... 3705477

[51] Int. Cl.[5] ..... B41F 5/00
[52] U.S. Cl. ..... 101/216; 101/375
[58] Field of Search ..... 101/152, 153, 375, 376, 101/212, 216

[56] References Cited

U.S. PATENT DOCUMENTS

| | | | |
|---|---|---|---|
| 1,134,697 | 4/1915 | Pervilhac | 101/152 |
| 3,003,417 | 10/1961 | Englander | 101/375 |
| 3,129,662 | 4/1964 | Pinkerton | 101/375 |
| 4,119,032 | 10/1978 | Hollis | 101/375 |
| 4,913,048 | 4/1990 | Tittgeneyer | 101/216 |

FOREIGN PATENT DOCUMENTS

| | | | |
|---|---|---|---|
| 0087730 | 9/1983 | European Pat. Off. | 101/375 |
| 470937 | 2/1929 | Fed. Rep. of Germany . | |

*Primary Examiner*—Edgar S. Burr
*Assistant Examiner*—Ren Yan

[57] ABSTRACT

To permit release of one bearing (21) from an opening (6) in one side wall (1) of a printing machine, so that a cover sleeve (12) can be applied over the cylinder (3), the cylinder (3) is retained in cantilever manner supported on the other bearing (22) by an auxiliary shaft (10) extending transversely to a shaft extension (5) from the cylinder, and secured, eccentrically, in side walls (9') of a gear box (9), customarily present on the machine. For axial adjustment of the shaft extension (5) of the cylinder, the auxiliary shaft is axially movable and positionable by a pair of positioning nuts (13, 14) threaded on one shaft end (16') of the auxiliary shaft (10) which, preferably, is formed with a positioning groove (11). The auxiliary shaft (10) by being eccentrically retained in the side walls (9') of the gear box, can be rotated to clear the shaft extension (5) of the cylinder, during operation of the printing machine, and, when rotated in engaged position, provide for precise axial positioning of the cylinder (3).

8 Claims, 1 Drawing Sheet

PRINTING MACHINE CYLINDER HOLDER ARRANGEMENT

Matter enclosed in heavy brackets [ ] appears in the original patent but forms no part of this reissue specification; matter printed in italics indicates the additions made by reissue.

Reference to related application, assigned to the assignee of the present application, the disclosure of which is hereby incorporated by reference: U.S. Ser. No. 07/150,089, filed Jan. 29, 1988, KOBLER, *now U.S. Pat. No. 4,823,693*. Reference to related publication: German Pat. No. 470,937.

*FIELD OF THE INVENTION*

The present invention relates to a holder arrangement for a cylinder of a printing machine when the cylinder is to be covered with a sleeve, and more particularly to permit the cylinder to be supported by the holder arrangement and one bearing at one shaft end only, so that the sleeve can be slipped over the cylinder, when it is free from a bearing at the other side.

BACKGROUND

The referenced application Ser. No. 07/150,089, filed Jan. 29, 1988, KOBLER, *now U.S. Pat. No. 4,823,693*, describes an arrangement of re-sleeve a cylinder with a sleeve which may include a printing forme, a printing plate, or a rubber blanket or coated sleeve, by introducing the sleeve through an opening of suitable size formed in one side wall of the printing machine over the cylinder. Application of sleeves on cylinders located in a printing machine by means of a sleeving apparatus has been previously proposed, see German Pat. No. 470,937. An opening is formed in the side wall of the machine, parallel to the axis of rotation of the respective cylinder, to provide access to the cylinder and to permit engagement with an auxiliary sleeving apparatus.

The referenced German Pat. No. 470,937 describes an auxiliary apparatus in which a carrier element, located in one of the side walls of the machine lifts the stub shaft of the respective cylinder. The carrier is located in the plane of the side wall of the machine. The cylinder is suitably supported, and the sleeve is suitably supported parallel to the axis of rotation of the respective cylinder. This, then, permits application of the sleeve over the bearing of the cylinder. The arrangement is designed to be used with an intaglio cylinder. Thereafter, the support is again placed in position to locate the stub shaft bearing, and the auxiliary apparatus can be removed.

The referenced patent is specifically directed to re-sleeving an intaglio cylinder. As is well known, printing cylinders using intaglio printing need not be shifted in position; they can be located in fixed axial positions in the side walls of the printing machine. The web on which printing is to be carried out is pressed by suitable rollers referred to as presser rollers against the intaglio cylinder for printing thereof, as well known.

It has been found that support of the cylinder may cause difficulties since an auxiliary holding apparatus must be applied against the outside wall of the printing machine to support the cylinder.

THE INVENTION

It is an object to improve apparatus for re-sleeving a printing machine cylinder in which the cylinder can be readily supported without requiring any external apparatus, and which can be integrated with the printing machine itself.

Briefly, the cylinder is supported in cantilever fashion on one of the bearings and, to retain it in cantilever manner, by a holding element which engages an extended shaft portion from the cylinder, extending beyond the side wall of the machine. A cross shelf which can be eccentrically retained in the gear box already present in the machine is positioned to engage transversely above the shaft extension of the respective cylinder at the side remote from the end which has been freed from the bearing to permit re-sleeving of the cylinder through an opening in the other side wall of the machine.

The arrangement has the advantage that no external support apparatus is necessary, that the support for the cylinder can be integrated with already existing components of the printing machine, or readily adapted to be added to the printing machine; and which is simple and reliable.

DRAWINGS

DETAILED DESCRIPTION

The invention will be described in connection with a rotary offset printing machine, and particularly to re-sleeve a rubber blanket cylinder with a new rubber cover. Of course, the invention is equally applicable to other types of printing machines where any kind of cover sleeve is to be applied to any cylinder.

Figure 1:
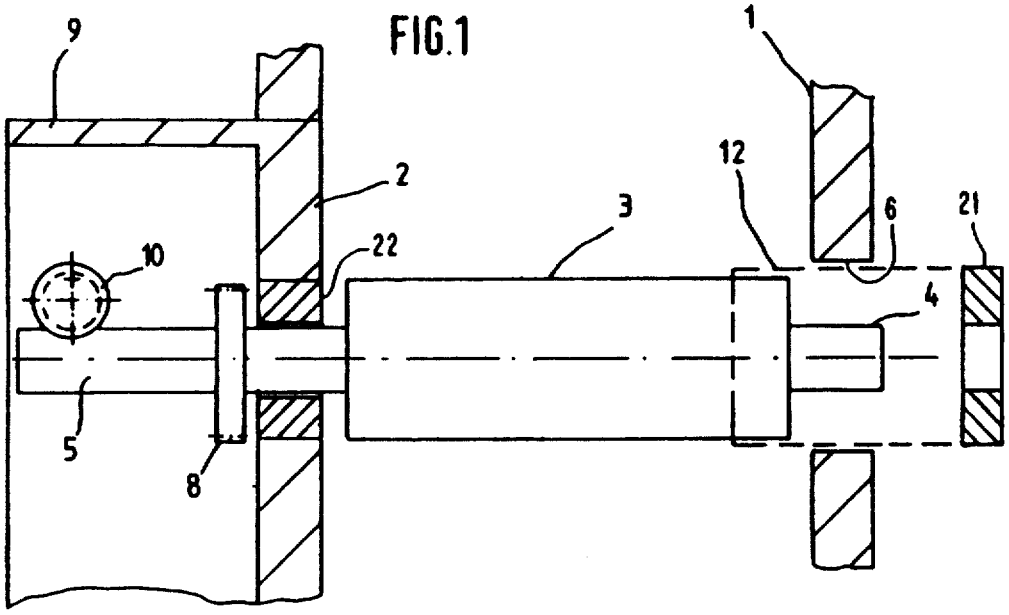
FIG. 1 is a schematic longitudinal fragmentary sectional view through a printing machine cylinder to which a cover sleeve is to be applied, and illustrating the cantilever support of the cylinder.
Figure 3:
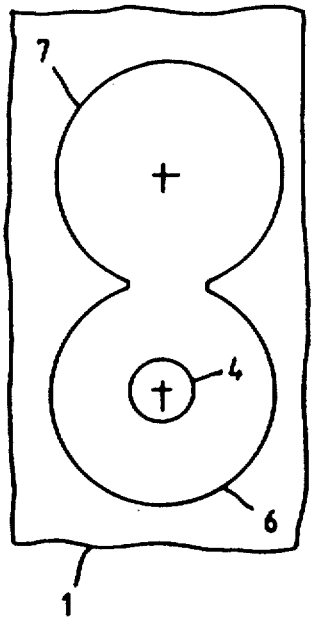
FIG. 3 is an end view of a portion of the side wall of the printing machine through which the sleeve is to be introduced.

FIG. 1 illustrates two side walls 1, 2 of a printing machine between which a cylinder 3 is supported in bearings. The cylinder 3 has a customary shaft 4, retained in a bearing 21 and shown in FIG. 1 exploded from the side wall 1. The left side—with respect to FIG. 1—of the cylinder 3 has a stub shaft 5 which is retained in a bearing 22 in the side wall 2. Stub shaft 5 carries a gear 8 which is located in a gear box 9. Gear 8, as is customary, is in engagement with other drive gears, not shown. Side wall 1 is formed with an opening 6 (FIG. 3) in which the bearing 21 is secured, which opening 6 is larger than the diameter of the cylinder 3 so that, after removal of the bearing 21, a sleeve 12 can be fitted over the cylinder 3. FIG. 3 illustrates the opening in dual form, with another opening 7 to permit, for example, re-sleeving of another cylinder, for example a plate cylinder (not shown) in engagement with the rubber blanket cylinder.

In accordance with a feature of the invention, the shaft end 5 is elongated and extends for some distance into the gear box 9. An auxiliary shaft 10, extending at least approximately, at right angles to the shaft 5, is rotatably retained in longitudinal end walls 9' of the gear box 9. Preferably, shaft 10 is formed with a trapezoidal-shaped groove 11 which extends circumferentially around the shaft.

OPERATION

Figure 2:
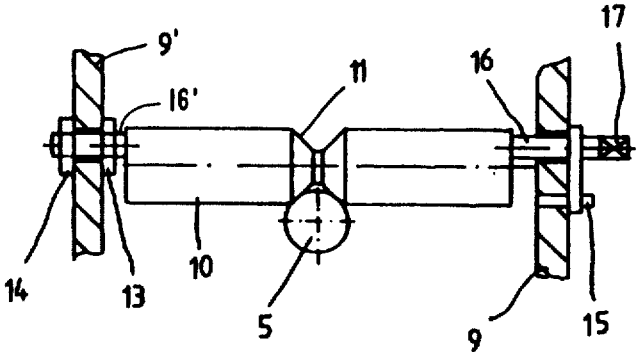
FIG. 2 is a part-sectional view illustrating support of the shaft of the printing machine cylinder and located at the outside of the printing zone of the printing machine.

To apply the sleeve 12 to the cylinder 3, auxiliary shaft 10 is engaged with the shaft 5, as shown in FIGS. 1 and 2, and then the bearing 21 can be removed from the side wall 1, thereby holding the cylinder 3 in cantilevered manner. The sleeve 12 can now be applied through the opening 6 over the cylinder 3. After resleeving the cylinder 3, bearing 21 is again assembled in the side wall 1.

In accordance with a feature of the invention, the auxiliary shaft 10 is eccentrically located in the side walls 9' of the gear box 9. The auxiliary shaft 10 has shaft extensions 16, 16' thereon, which are eccentrically attached to the auxiliary shaft 10. Shaft extension 16 projects beyond the right-hand side wall 9' and terminates in a square or hexagonal end portion 17 to permit application of a wrench or the like so that the auxiliary shaft 10 can be rotated. This permits initially clearing of the auxiliary shaft 10 from the shaft end 5 of cylinder 3, and then, upon rotation of the auxiliary shaft 10, engagement with the shaft end 5 until the desired support position has been reached. Thus, the vertical engagement between the auxiliary shaft 10 and the shaft end 5 can be adjusted. This adjustment can be pre-set, for example by placing a stop pin 15 on the right side wall 9' of the gear box 9, to be engaged by a suitable strap or stop bar or the like. The shaft end 16' at the left side—with respect to FIG. 2—is threaded and has positioning nuts 13, 14 located thereon, one inside and one outside of the left side wall 9' of the gear box 9. By suitable adjustment of the respective nuts 13, 14, the auxiliary shaft 10 can be shifted axially, for perfectly centered engagement with the shaft end 5. After adjustment, the nuts 13, 14 can then be tightened against each other to retain the adjusted position of the auxiliary or hold-down shaft 10.

The eccentric retention of the auxiliary shaft 10, combined with the nuts 13, 14, permits placement of the cylinder 3 between the side walls 1, 2 in a predetermined fixed position and maintaining the cylinder 3 in that position. This permits easy application of the sleeve 12 through the opening 6 in the side wall 1. After the sleeve 12 has been applied to the printing cylinder 3, the bearing 21 is reassembled with the side wall 1 on the shaft. The nuts 13, 14 are then loosened and by rotation of the engagement and 17, the auxiliary shaft 10 is lifted off slightly from the shaft end 5, so that the cylinder 3, as well as the shaft end 5, can rotate freely.

The bearings 21, 22, of course, can be retained within eccentrics to adjust the position of the cylinder 3 with respect to other cylinders in a printing machine (not shown) as well known. Since such auxiliary eccentrics and other apparatus do not form part of the present invention, although they can be used when practicing the present invention, they have been omitted from the drawing and description, for clarity. Retention of eccentrics in a predetermined position is explained in the referenced application Ser. No. 07/150,089, filed Jan. 29, 1988, KOBLER, *now U.S. Pat. No. 4,823,693*, which is readily used in combination with the present invention, since the position of shaft 5, and hence of the cylinder 3 with respect to any reference position, is ensured by engagement of the shaft end 5 with the auxiliary shaft 10.

Various changes and modifications may be made within the scope of the inventive concept.

I claim:

1. In a printing machine, a [printing] cylinder holding arrangement for holding in position a [printing] cylinder (3) to permit application of a cover sleeve (12) over the cylinder, wherein the cylinder has two shaft ends (4, 5) axially extending therefrom;

wherein the printing machine has two side walls (1, 2) and two bearing means (21, 22) positioned in said side walls and rotatably retaining the shaft ends (4, 5) in the side walls, one side wall (1) permitting release of the associated bearing means (21) and being formed with an opening (6) of sufficient size to permit introduction of the cover sleeve (12) therethrough after release of the bearing means (21) retaining the respective shaft end (4) in said one slot wall, said holding arrangement supporting the cylinder (3) in cantilever manner on the second bearing means (22) after release of the first bearing means (21), said second shaft (5) being elongated and forming a lever engagement arm, and comprising:

a pair of structural elements (9') secured to that side wall proximate said second shaft end extending approximately parallel to the said second shaft end (5);

an auxiliary shaft (10) extending transversely to said second shaft end (5) and positioned thereabove, said auxiliary shaft being eccentrically rotatably retained in said structural elements;

locating means (11) on said auxiliary shaft determining the axial position of the auxiliary shaft with respect to the shaft end (5);

means (17) for rotating said auxiliary shaft to permit engagement of the auxiliary shaft with said second shaft end, or release said second shaft end therefrom; and means (16, 16'; 13, 14) for controllably axially positioning said auxiliary shaft (11) with respect to *said* structural elements (9') and thereby position said locating means (11) and hence the second shaft end (5) in predetermined position to control the direction of cantilever projection of said cylinder (3).

2. The printing machine of claim 1, wherein said printing machine includes a gear box (9) and said structural elements comprise upstanding side walls of said gear box.

3. The printing machine of claim 1, wherein said auxiliary shaft (10) is formed with shaft ends (16, 16') extending through said structural elements (9');

and wherein at least one (16') of said auxiliary shaft ends includes a threaded portion and adjustment nuts (13, 14) located, respectively, inside and outside of the structural elements (9') to provide for axial adjustment of the auxiliary shaft (10) with respect to said second shaft (5) of the cylinder.

4. The printing machine of claim 2, wherein said auxiliary shaft (10) is formed with shaft ends (16, 16') extending through said side walls (9') of the gear box;

and wherein at least one (16') of said auxiliary shaft ends includes a threaded portion and adjustment nuts (13, 14) located, respectively, inside and outside of the adjacent side wall (9') of the gear box to provide for axial adjustment of the auxiliary shaft (10) with respect to said second shaft (5) of the cylinder.

5. The printing machine of claim 1, wherein said locating means comprise a circumferential groove formed in the auxiliary shaft (11) and at least in part fitting about said second shaft end (5).

6. The printing machine of claim 2, wherein said locating means comprise a circumferential groove formed in the auxiliary shaft (11) and at least in part fitting about said second shaft end (5).

7. The printing machine of claim 3, wherein said locating means comprise a circumferential groove formed in the auxiliary shaft (11) and at least in part fitting about said second shafat end (5).

8. The printing machine of claim 4, wherein said locating means comprise a circumferential groove formed in the auxiliary shaft (11) and at least in part fitting about said second shaft end (5).

* * * * *